J. H. NESBITT.
APPARATUS FOR TILTING AUTOMOBILES.
APPLICATION FILED JUNE 14, 1921.

1,435,654.

Patented Nov. 14, 1922.

Inventor
James H. Nesbitt
By John A. Bumhardt
Atty.

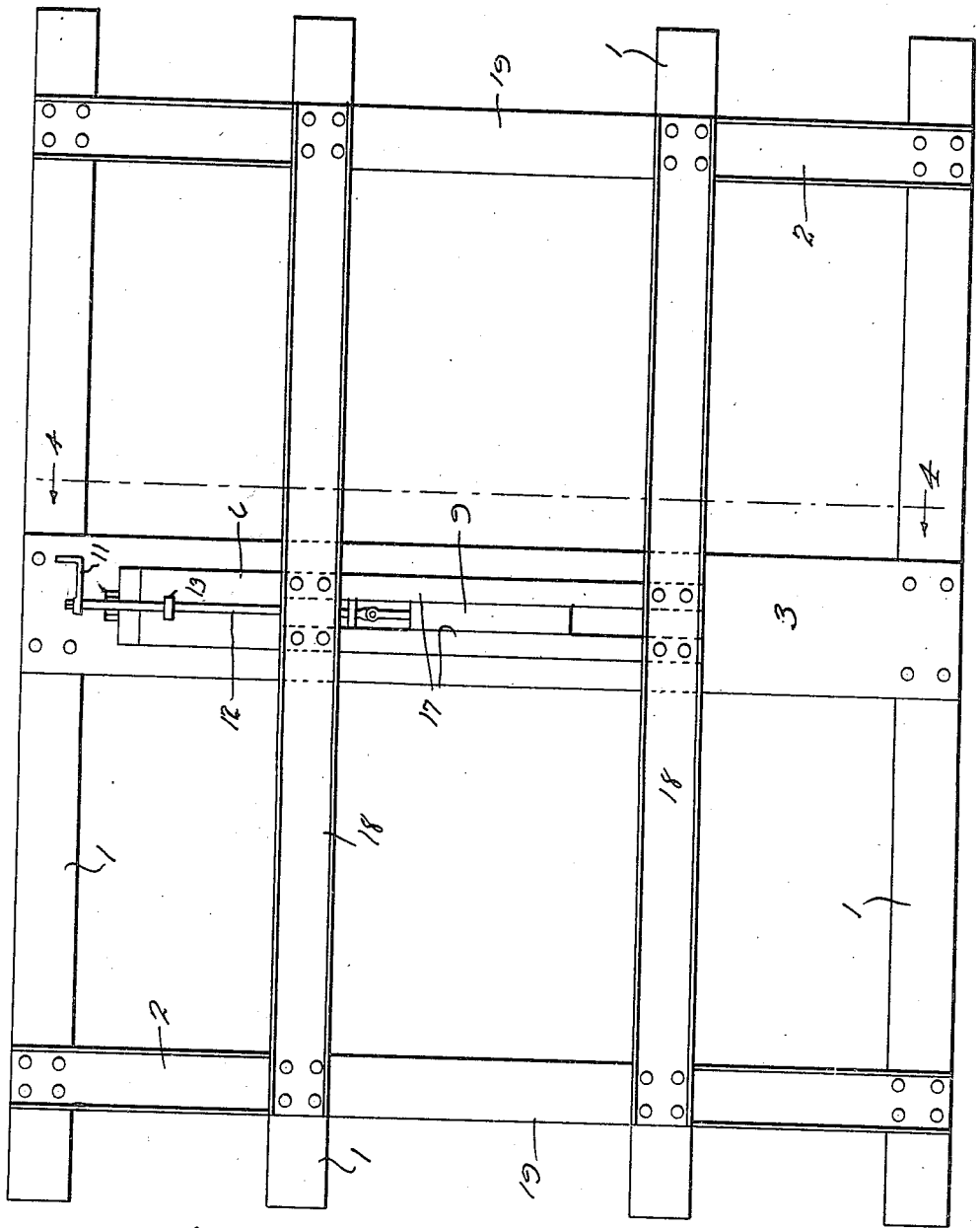

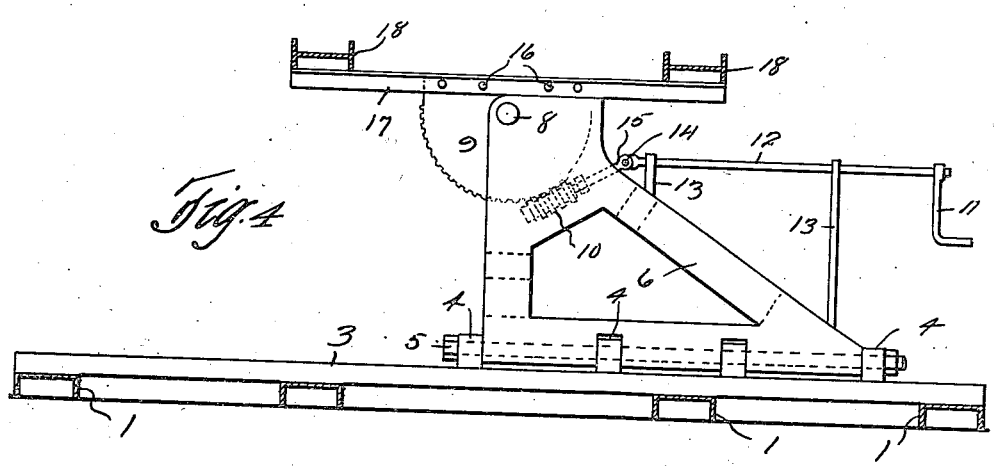
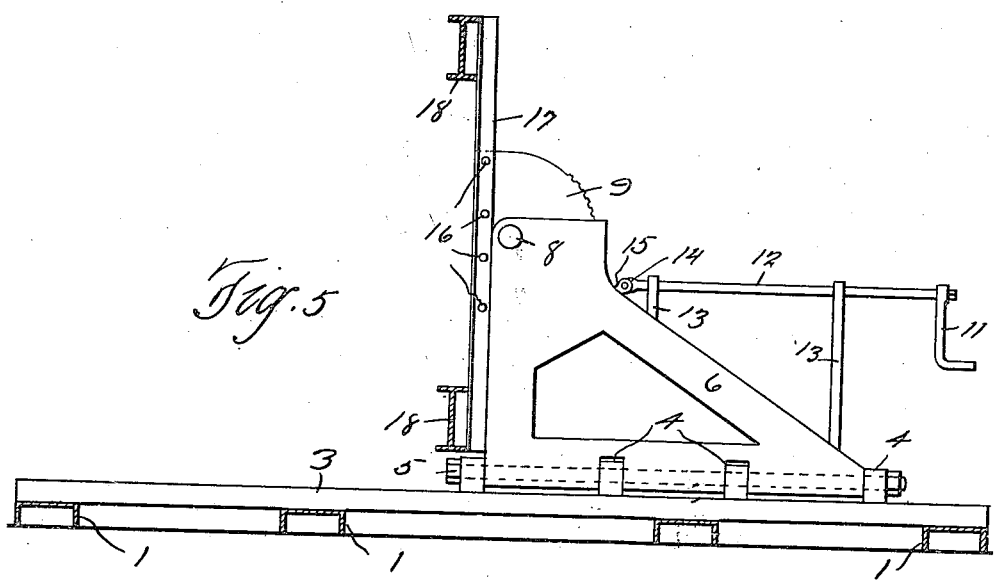

Patented Nov. 14, 1922.

1,435,654

UNITED STATES PATENT OFFICE.

JAMES H. NESBITT, OF CLEVELAND, OHIO.

APPARATUS FOR TILTING AUTOMOBILES.

Application filed June 14, 1921. Serial No. 477,436.

*To all whom it may concern:*

Be it known that I, JAMES H. NESBITT, a citizen of the United States, residing at Cleveland, in the county of Cuyahoga and State of Ohio, have invented certain new and useful Improvements in Apparatus for Tilting Automobiles, of which the following is a specification.

This invention relates to cradles for automobiles, of the type in which an automobile is run on to a pivoted track or support which is then turned about its pivot to turn the automobile on its side, more or less, so that access can easily be had to the under parts of the automobile in convenient position for work thereon.

The device comprises a tilting track or support, which can be tilted one way so that the automobile can be run on to the track while the latter is in inclined position, and the track is then swung up to horizontal position, and then tilted at a right angle to the direction of the former tilt, to swing the automobile on its side. This enables the tilting operation to be quickly and effectively performed.

Figure 1:
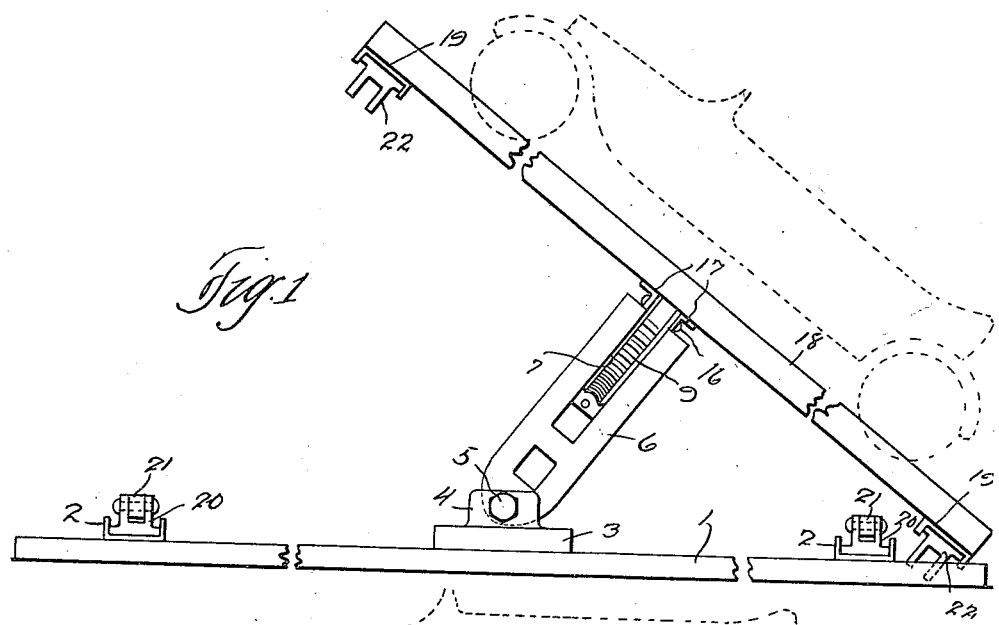
Figure 2:
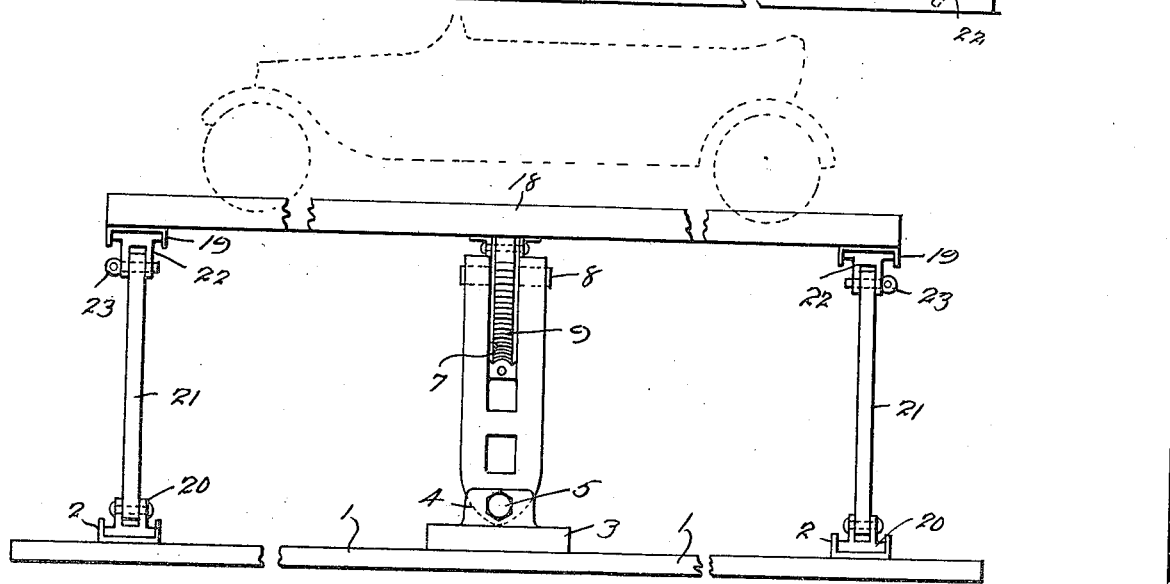

The apparatus will be more fully apparent from the following description and the accompanying drawings in which Fig. 1 is a side elevation of the structure, in tilted position so that a car may be run on to it. Fig. 2 is a similar view, showing the track swung up to horizontal position. Fig. 3 is a plan. Fig. 4 is a section on the line 4—4 of Fig. 3. Fig. 5 is a view similar to Fig. 4, showing the track tilted through 90 degrees.

The apparatus consists of a base made up of spaced parallel channel bars 1 connected at each end by cross bars 2 and in the middle by a plate 3. This plate has a row of lugs 4, to which is pivoted, by a bolt 5, a heavy angle bracket or member 6, which is forked at its upper end as indicated at 7 to receive therein a large segmental worm gear 9 pivoted thereto by a shaft 8. The gear 9 is adapted to be rotated by a worm 10, carried by a shaft section 15 connected by a universal joint 14 to a shaft 12 provided with a crank handle 11 and supported by standards 13 mounted on the angle member 6.

The gear 9 is riveted at 16 to cross bars 17 to the opposite ends of which are fastened tracks 18 conveniently made of I-beams. These beams are connected at their outer ends by cross beams 19.

Brackets 20 are fastened to the cross bars 2 of the base, and struts 21 are pivoted to these brackets, in position to swing transversely when desired. The upper or free ends of these struts are adapted to be attached to brackets 22, secured to the under side of the cross beams 19, by means of pins 23, these pins being in line with the shaft 8. The pins may be removed and the struts 21 swung down to allow the track structure to swing down to inclined position, as shown in Fig. 1.

In operation, the struts are disconnected by removing the pins 23 and the track is then tilted endwise as shown in Fig. 1, one end of the tracks 18 being located at or near the ground. When in this position the automobile is run up on the inclined tracks 18. Then by power or other devices the whole track structure with the automobile thereon is swung up to horizontal position as shown in Fig. 2, and the struts 21 are then swung up and connected by the pins 23. The automobile wheels will of course be fastened by chains or clamps to the tracks 18 so as to hold the same thereon. The device is then in position to tilt the auto on its side. This is done by operating the crank 11, which by its connection with the segment gear 9 swings the track or platform about the shaft 8 and pins 23 as a pivot, turning the track to vertical position more or less as indicated in Fig. 5, and exposing the under side of the automobile in convenient position for operation, the parts being readily accessible between the tracks 18 and the cross beams 19. The track may then be turned to original position, and then tilted to the position shown in Fig. 1 and the automobile run off.

The whole provides a device which can be readily constructed and conveniently operated for the intended purpose.

I claim:

1. The combination of a base, an angle frame pivoted at its lower end thereto, to swing in one direction, a track structure extending across the frame and pivoted to the top thereof to tilt sidewise, and folding struts between the base and the opposite ends of the track.

2. The combination of a base, an angle frame pivoted at its lower end to the base, said angle frame having a vertical inner edge, a track structure extending across the frame and pivoted to the upper end thereof adjacent the said vertical edge, whereby the track may be tilted to vertical position against said edge, the respective pivots being at a right angle to each other, and power means to tilt the track on its pivot.

3. The combination of a base, an angle frame pivoted at its lower end to the base, a track structure extending across the frame and pivoted to the upper end thereof, the respective pivots being at a right angle to each other, and power means to tilt the track on its pivot, said means comprising a segment gear fixed to the track and crank and gear meshing with said segment gear.

4. The combination of a base having lugs thereon, an angle frame pivoted to said lugs, a track structure pivoted at the upper end of said angle frame, said pivots being at a right angle to each other, the pivot between the base and the frame permitting one end of the track to swing down toward the base, and the pivot between the track structure and the frame permitting the former to tilt sidewise, power means to tilt the track structure sidewise, and swinging struts pivoted to the base and detachably connected to the track structure at the ends thereof.

In testimony whereof, I do affix my signature in presence of two witnesses.

JAMES H. NESBITT.

Witnesses:
 JOHN A. BOMMHARDT,
 BESSIE F. POLLAK.